(No Model.) 2 Sheets—Sheet 1.
C. A. VINCENT.
VEHICLE RUNNING GEAR.

No. 451,144. Patented Apr. 28, 1891.

Witnesses:—
H. B. Kingsbery
Chas. Davis

Inventor:—
Charles A. Vincent,
by William E. Poulter, atty

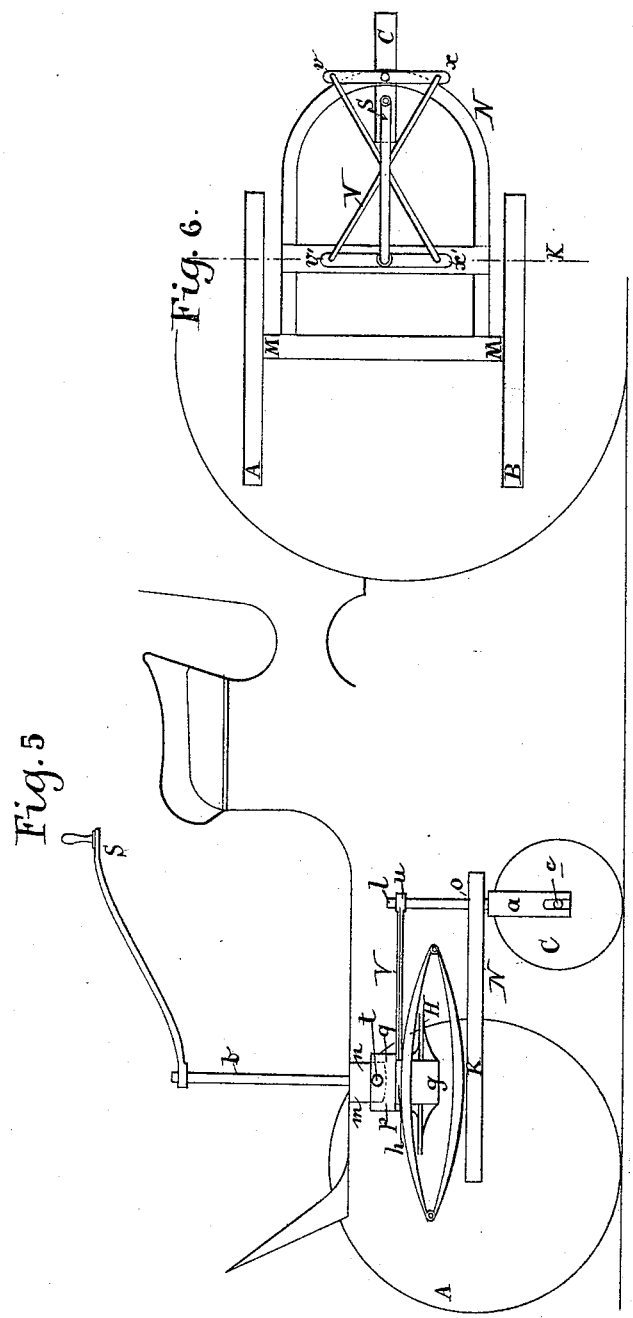

UNITED STATES PATENT OFFICE.

CHARLES ALFRED VINCENT, OF PARIS, FRANCE.

VEHICLE RUNNING-GEAR.

SPECIFICATION forming part of Letters Patent No. 451,144, dated April 28, 1891.

Application filed December 30, 1890. Serial No. 376,239. (No model.)

*To all whom it may concern:*

Be it known that I, CHARLES ALFRED VINCENT, a citizen of the French Republic, residing at Paris, in France, have invented certain new and useful Improvements in Vehicles, of which the following is a full, clear, and exact description.

My invention has relation to vehicles, and more especially to the running and steering gears thereof, and among the objects in view are to provide the running-gear of a vehicle with means whereby the latter may be steered in the direction required with ease and promptness, regardless of the weight of the load carried by said vehicle, and to provide the running-gear of a vehicle with means for steering the latter, said means being arranged to sustain a portion of the weight of the load, and thus more equally distribute the same over the entire running-gear.

Other objects and advantages of my invention will be apparent from the description given hereinafter; and with all the objects in view, the invention consists in the construction, relative arrangement, and combinations of parts, as hereinafter fully described, illustrated in the accompanying drawings, and particularly pointed out in the claims.

Figure 2:
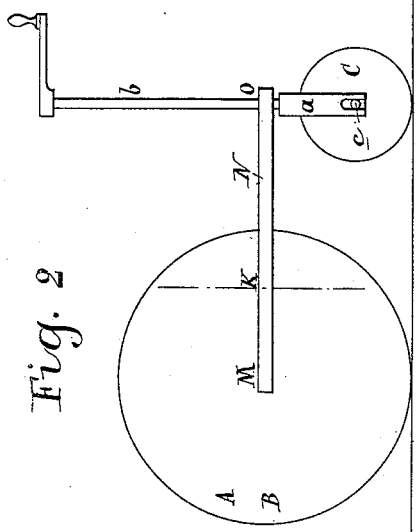
Figure 4:
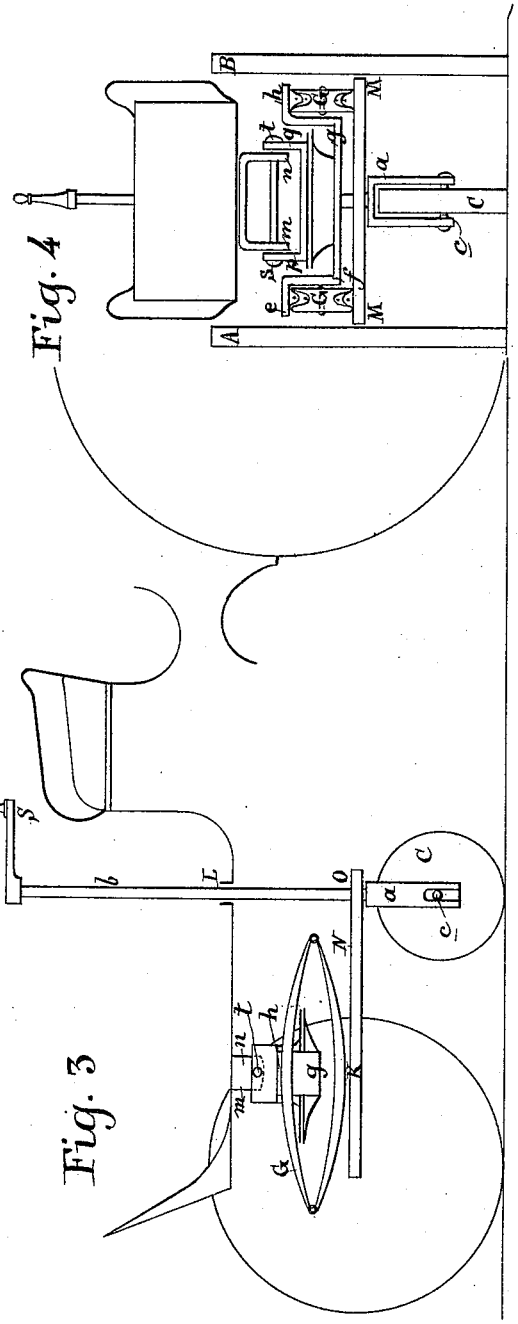
Figure 1:
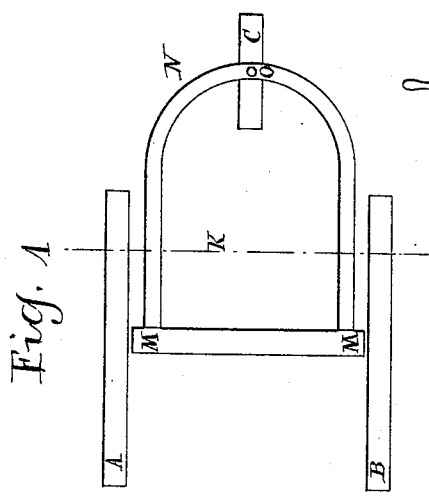
Figure 3:
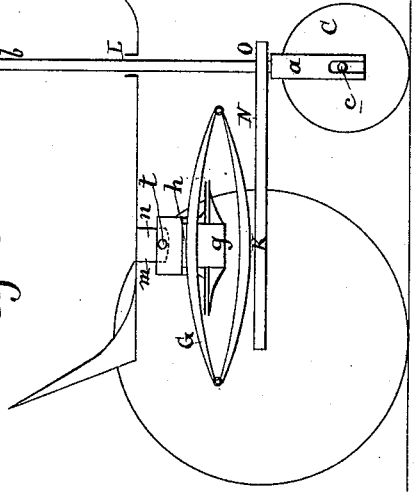

In the drawings, Figure 1 is a plan view of the combined running and steering gears; Fig. 2, a side elevation thereof; Fig. 3, a side elevation of a portion of the body of a vehicle, (one of the front wheels being removed,) showing the adaptation of my running and steering gears thereto; Fig. 4, a front elevation thereof; Fig. 5, a view similar to Fig. 3, showing a slightly-different arrangement of the steering devices; Fig. 6, a plan view of Fig. 5, with the body of the vehicle removed.

My improvements, hereinafter described, are adapted to be applied to almost any style of vehicle employing either two or four wheels, though my invention is more particularly adapted for use with four-wheeled vehicles and whether driven by hand, foot, or other power.

In the drawings I have illustrated my invention as applied to a four-wheeled vehicle, and in said drawings A B indicate the front wheels of the vehicle mounted upon the ends of the axle M, which is rigidly secured to and supported by the horizontal U-shaped frame N, through the rear curved portion of which loosely passes the vertical rod b, which at its upper end is provided with the steering handle S, and at its lower end is secured to or has formed integral therewith a fork a, in the lower ends of the arms of which an axle c has its bearings, upon which axle is mounted a wheel C. The latter serves as a steering-wheel for the vehicle and can be readily turned by means of the handle S, rod b, and fork a to cause it to guide the vehicle in the desired direction.

Instead of making the frame N of the shape shown, it may have any other desired shape that will serve the same purpose. The rear curved portion of said frame, as will be seen, is supported upon the upper end of the fork a. At a point intermediate the axle M and the bar N is clipped or otherwise secured to each of the arms of the frame a spring G, and upon which springs bear and are secured the opposite ends of an angular piece $e\,f\,g\,h$, Fig. 2, and upon which latter is supported the lower section of an ordinary fifth-wheel H. The upper section of said wheel is secured to the U-shaped piece $p\,q$, to which is pivotally connected a like shaped piece $m\,n$ by means of a pivotal bolt $t$, said piece $m\,n$ being rigidly secured to the under side of the body of the vehicle. An ordinary king-bolt or the like should connect the sections of the fifth-wheel.

By the described arrangement the vehicle-body is permitted to have a lengthwise movement independently of its forward running-gear, thereby in a measure freeing said body from unusual jolting or jarring movements, and at the same time the steering-wheel is caused to maintain contact with the ground.

I prefer to make the piece $e\,f\,g\,h$ angular, as shown, especially when my gear is applied to a vehicle where the driving-power is applied directly to the rear wheels, as I thus bring the weight of the vehicle-body and its load nearer to the frame N and attain greater steadiness of the forward gear.

The body of the vehicle should be provided with a slot L in its bottom, through which freely passes the rod b, and said slot should be curved in order to allow of a swinging movement of the rod b, which would be caused when the vehicle is being guided obliquely in one or the other direction, the center of the curvature of the slot being the king-bolt and its radius the distance between the said bolt and the rod $b$.

It will be seen that the frame N forms a connection between the front wheels and the steering-wheel, which permits all said wheels to move together independently of the vehicle-body, and at the same time allows the steering-wheel to have a turning movement independently of both the frame and the front wheels.

Instead of arranging the wheel C in rear of the front wheels, it might be located forwardly thereof, and in such case I would modify the arrangement of the steering devices.

In Figs. 5 and 6 I have illustrated a modified arrangement of steering devices adapted for either arrangement of the steering-wheel, wherein the king-bolt is extended upwardly to form the rod $b'$, and upon said bolt secure a transverse bar $v'\,x'$, to the arms of which are pivotally secured one end of diagonally-arranged rods V, whose opposite ends are pivotally secured to the ends of a transverse bar $v\,x$, secured to the rod $b$, which is here considerably shortened. It will, however, be understood that in the above-described construction and arrangement of parts the vehicle-body are not adapted for longitudinal movement independently of the running-gear.

In cases of vehicles designed for carrying heavy loads I might employ a system of gears, chains, &c., for giving direction to the steering-wheel.

The location of the pivotal point of the vehicle-body, as indicated by the dotted line K, should be determined by the weight that the vehicle is to carry, so that the steering-wheel will be in a position to sustain a portion of such weight and be caused to maintain contact with the ground, and therefore the distance between the axle M and the line K will vary.

Having described my invention, what I claim, and desire to secure by Letters Patent, is—

1. In a vehicle, the combination, with the body, of a pair of wheels mounted upon an axle, a frame to which said axle is secured, a steering-wheel carried by said frame and adapted to have a turning movement relatively thereto, springs carried by said frame, a transverse bar having its ends secured to said springs, a second transverse bar to which the body of the vehicle is pivotally connected, and a fifth-wheel located between said bars, all said parts being arranged and adapted for co-operation as described.

2. In a vehicle, the combination, with the body, of a pair of wheels mounted upon an axle, a frame to which said axle is secured, a steering-wheel carried by said frame and adapted to have a turning movement relatively thereto, springs carried by said frame, a transverse bar having its ends secured to said springs, a second transverse bar to which the body of the vehicle is pivotally connected, a fifth-wheel located between said bars, a king-bolt extending upwardly and provided with a handle, and rods connecting said bolt with the steering-wheel, for the purpose specified.

In testimony that I claim the foregoing I have hereunto set my hand this 26th day of November, 1890.

CHARLES ALFRED VINCENT.

Witnesses:
ROBT. M. HOOPER,
VICTOR HATRAY.